United States Patent [19]

Galimberti et al.

[11] Patent Number: 5,196,496
[45] Date of Patent: Mar. 23, 1993

[54] SYNDIOTACTIC CRYSTALLINE COPOLYMERS OF PROPYLENE AND 1-BUTENE

[75] Inventors: Maurizio Galimberti, Milan; Enrico Albizzati; Romano Mazzocchi, both of Novara, all of Italy

[73] Assignee: Himont Incorporated, Wilmington, Del.

[21] Appl. No.: 721,049

[22] Filed: Jun. 26, 1991

[30] Foreign Application Priority Data

Jun. 27, 1990 [IT] Italy ............................ 20778 A/90

[51] Int. Cl.$^5$ ...................... C08F 210/06; C08F 4/64
[52] U.S. Cl. .................. 526/348.6; 526/160; 526/901
[58] Field of Search ............ 526/160, 348.6, 901

[56] References Cited

U.S. PATENT DOCUMENTS 4,892,851  1/1990  Ewen et al. ..................... 502/104

FOREIGN PATENT DOCUMENTS 0395055  10/1990  European Pat. Off.

Primary Examiner—Fred Teskin

[57] ABSTRACT

Essentially syndiotactic crystalline copolymers of propylene with minor proportions of 1-butene, endowed with good mechanical properties, lowered melting point and limited solubility in xylene at 25° C. and the process for their preparation by polymerizing mixtures of propylene with 1-butene, by using catalysts obtained form stereorigid and chiral zirconium and hafnium compounds and from polymethylalumoxane compounds.

2 Claims, No Drawings

SYNDIOTACTIC CRYSTALLINE COPOLYMERS OF PROPYLENE AND 1-BUTENE

The present invention concerns new crystalline copolymers of propylene with an essentially syndiotactic structure and the process for their preparation. It is already known how to modify isotactic polypropylene by introducing, during polymerization, small quantities of comonomers, mainly ethylene and 1-butene, in order to obtain a polymer with a lowered melting point adequate for the production of films with improved weldability characteristics.

From J.A.C.S. 1988, 110, 6255, it is known how to polymerize propylene with a catalytic system obtained from stereorigid zirconium or hafnium metallocene, such as the dichlorides of Zr or Hf isopropyl(cyclopentadienyl-1-fluorenyl), and polymethylaluminoxane, thus obtaining a syndiotactic polypropylene.

Published European application 318 049 describes the preparation of crystalline copolymers with an isotactic structure of the propylene with minor proportions of ethylene, butene-1 or 4-methylpentene-1, having good mechanical characteristics and low solubility in xylene at 25° C., which is carried out by polymerizing the olefins with catalysts obtained from stereorigid and chiral zirconium compounds, such as ethylene-bis-(4,5,6-tetrahydroindenyl) zirconium dichloride, and polymethylaluminoxane compounds.

Now, according to this invention, by using catalytic systems obtained from:
a) isopropyl(cyclopentadienyl-1-fluorenyl) zirconium or hafnium dichloride,
b) an aluminoxane compound of the formula:

where n is a number from 2 to 25, or

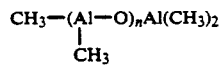

where n is a number from 1 and 25, it is possible to obtain essentially syndiotactic copolymers of propylene with minor proportions of 1-butene, having high crystallinity and good mechanical properties (very similar to the syndiotactic propylene homopolymer), a melting point from 110° C. to 140° C. and limited solubility in xylene at room temperature (the fraction of polymer soluble in xylene at 25° C. is less than 10% by weight), by polymerizing the monomers under conditions where the copolymer which is formed has a composition similar to that of the mixture of the monomers present in the gas phase.

It has been found, and this constitutes a completely surprising aspect of the present invention, that the composition of the copolymers is similar to that of the monomers present in the gas phase when the butene-1 content of said mixture is from 1.15 to 10% in moles.

By operating under the conditions indicated above, one obtains copolymers with a homogeneous comonomer distribution. This is determined by way of 13C-NMR: there is no presence of signals typical of the sequence of several butene units. By essentially syndiotactic copolymers are meant copolymers having a rrrr pentad content greater than 85%.

The possibility of obtaining the copolymers of this invention was totally unexpected, since the polymerization of propylene with comonomers which are different from butene-1, such as ethylene and 4-methylpentene-1, provides copolymers which are highly soluble in xylene at 25° C.

The preparation of the copolymers of this invention using the catalysts described above is done by conducting the polymerization in liquid phase (in the presence of an inert hydrocarbon solvent or in liquid propylene) and feeding a gaseous mixture of the monomers having a constant composition. The polymerization is carried out at temperatures from −30° to 70° C., preferably from 20° to 30° C.

The copolymers obtained under the conditions described above have an intrinsic viscosity in tetrahydronaphthalene at 135° C. of greater than 0.2 dl/g. As already indicated, the copolymers are useful mainly in the film field due to the good features of sealability of the films obtained therefrom.

The following examples are given to illustrate and not limit the invention.

EXAMPLES

EXAMPLE 1

Synthesis of Polymethylaluminoxane

Into a 500 ml flask equipped with a thermometer, a bubble condenser connected to the gas meter, a 100ml drip funnel, a valve for gaseous nitrogen, and a magnetic agitator, are fed, under a nitrogen atmosphere, 39.4 g of $Al_2(SO_4)_3 16H_2O$, 250 ml of toluene and 50 ml of $AlMe_3$, by means of a drip funnel.

The nitrogen valve is shut off while the one to the gas meter is opened and, at ambient temperature, the Al-trimethyl is dripped over 5 to 10 minutes into the aluminum sulfate suspension which is maintained under intense agitation.

The temperature increases to 55° C., then it is brought to 70° C. and kept constant by way of a hot bath. The reaction is completed in 4 hours. The suspension is filtered and the solution dried. 15.8 g of product are obtained, which corresponds to a 44% yield.

The average cryoscopic molecular weight is 1200 and the average oligomerization degree is 21.

Synthesis of the Zirconium Compound

The synthesis of isopropyl(cyclopentadienyl-1-fluorenyl)-zirconium dichloride has been carried out according to J.A.C.S. 1988, 110, 6255, as indicated below.

All operations are carried out in an inert atmosphere.

4.93 g of ligand, isopropyl(cyclopentadiene-1-fluorene), are dissolved in about 150 ml of tetrahydrofuran. To this solution are added, by way of a drip funnel and under agitation, 23 ml of n-butyl lithium (1.6M in hexane equal to 6.8 moles). The dianion salt is isolated as red solid by evaporating the solvent under vacuum, and is then purified by washing it a few times with pentane. 4.62 g of $ZrCl_4$ are suspended in 200ml of $CH_2Cl_2$ and cooled to −78° C., the vessel containing the dianion is also cooled to −78° C. The $ZrCl_4$ suspension is rapidly poured on the solid dianion, maintained under agitation for about 2 hours at −78° C., then the temperature is allowed to go to ambient temperature, and the mixture is kept under agitation overnight. The LiCl is removed by filtration and it is washed repeatedly with $CH_2Cl_2$. The product is obtained by crystallization at $-78°$ C.

Polymerization

In a 100 ml glass autoclave equipped with a valve connected to the vacuum/nitrogen lines, a magnetic agitator and a thermostat at 25° C., is introduced, under nitrogen flow, a solution containing 77.1 mg of polymethylaluminoxane in 50 ml of toluene. After removing the nitrogen phase, a propylene/1-butene mixture is fed continuously (flow rate 30 l/h) at a pressure of 2 atm. A solution containing 0.7 mg of the zirconium compound prepared as above and 21.2 mg of a polymethylaluminoxane in 10 ml of toluene is then added. The pressure of the gas mixture is brought to 3 atm. The polymerization is interrupted after 90 minutes by injecting 1 ml of methanol. 3 g of polymer are obtained.

The catalyst components used in Example 2 and Comparative Examples 1, 2, and 3, are the same as the one in Example 1.

EXAMPLE 2

A propylene/1-butene copolymerization is carried out according to the same procedure of Example 1, and with the following quantities of ingredients: 0.2 mg of the zirconium compound, 26.0 mg of polymethylaluminoxane, 55 ml of toluene. A mixture containing 1.65 moles of butene is introduced at 3 atm pressure and at a flow rate of 30 l/h. After 30 minutes at 25° C., 0.8 g of polymer are obtained.

COMPARATIVE EXAMPLE 1

In a 1 liter glass autoclave, equipped with outside thermal jacket, valves connected to vacuum/nitrogen lines, and a mechanical agitator, are introduced 350 ml of toluene under propylene flow, and is then saturated with gaseous propylene at 15° C. The thermostat of the thermal jacket is set at 25° C., and a solution containing 1.85 mg of the zirconium compound and 0.87 g of polymethylaluminoxane in 10 ml of toluene is added. It is then pressurized at 4 atm and polymerized for 80 minutes at 25° C. Polymerization is interrupted by degassing and injecting 1 ml methanol. 100 g of polymer are obtained.

COMPARATIVE EXAMPLE 2

The propylene/ethylene copolymerization is carried out according to the method of Example 1, and with the following quantities of ingredients: 0.9 mg of the zirconium compound, 183 mg of polymethylaluminoxane, 45 ml toluene. A mixture containing 2.5% moles of ethylene at 3 atm pressure is fed, at a flow rate of 30 l/h. After 20 minutes at 26° C., 6.3 g of polymer are obtained.

COMPARATIVE EXAMPLE 3

The propylene/4-methyl-1-pentene copolymerization is carried out in the 100 ml autoclave of Example 1.

Into the autoclave, with the thermostat set at 25° C., are fed 69.4 mg of polymethylaluminoxane and 60 ml of toluene under nitrogen flow. The nitrogen is then removed and 1 ml of 4-methyl-1-pentene is added under nitrogen atmosphere, and then a solution containing 114.1 mg of polymethylaluminoxane and 1.8 mg of the zirconium compound in 5 ml of toluene is injected. The pressure is brought to 3 atm. Polymerization is interrupted after 1 hour by injecting 1 ml methanol. 7.3 g of polymer are obtained.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

TABLE

| Example No. | Comonomer | Gas composition molar % C3 | Gas composition molar % Comonomer | Time (min) | Yield (g) | Copolymer composition C3 | Copolymer composition Comonomer | inh (dl/g) | m.p. (°C.) | soluble fraction in xylene (25° C.) weight % |
|---|---|---|---|---|---|---|---|---|---|---|
| 1 | 1-butene | 98.5 | 1.5 | 30 | 0.8 | 98.7 | 1.3 | 1.10 | 131.0 | 4.2 |
| 2 | 1-butene | 97.0 | 3.0 | 90 | 3 | 97.7 | 2.3 | 0.95 | 120.4 | 5.7 |
| Comp. 1 | = | 100.0 | 0 | 80 | 100 | 100.0 | 0 | 1.30 | 138.8 | 0.8 |
| Comp. 2 | ethylene | 97.5 | 2.5 | 45 | 6.3 | 98.7 | 1.3 | 0.91 | 118.7 | 43.4 |
| | | P(atm) | ml | | | | | | | |
| Comp. 3 | 4-Me-1-pentene | 3 | 1 | 60 | 7.3 | 97.9 | 2.1 | 0.94 | 110.3 | 27.6 |

What is claimed is:

1. Crystalline copolymers of propylene and 1-butene with an essentially syndiotactic structure, containing from 1.3 to 10 mole % of 1-butene units, having a melting point from 110° to 140° C., a fraction soluble in xylene at 25° C. less than 10% by weight, and a composition similar to the mixture of the monomers present in the gas phase during preparation of said polymer, wherein the difference between the amount of comonomer present in the gas phase and the amount of comonomer in said composition is between 13% to 23% less in the composition of said copolymer.

2. A process for the preparation of the copolymers of claim 1 comprising the polymerization of gaseous mixtures of propylene and 1-butene with catalysts obtained from isopropyl (cyclopentadienyl-1-fluorenyl) hafninum or zirconium dichloride and polymethylaluminoxane cyclic or linear compounds of the formula

where n is a number from 2 to 25 and

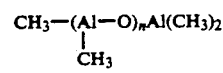

where n is a number from 1 to 25, operating under conditions where the 1-butene molar content present in the gas mixture being continuously fed is from 1.5 to 10%, and the polymerization is conducted in the liquid phase, at a temperature of from $-30°$ to 70° C.

* * * * *

UNITED STATES PATENT AND TRADEMARK OFFICE
CERTIFICATE OF CORRECTION

PATENT NO. : 5,196,496

DATED : March 23, 1993

INVENTOR(S) : Maurizio Galimberti et al.

It is certified that error appears in the above-identified patent and that said Letters Patent is hereby corrected as shown below:

col. 1, line 63, change "1.15" to --1.5--.

col. 2, line 59, change "6.8" to --36.8--.

col. 4, line 41, change "polymer" to --copolymer--.

Signed and Sealed this

First Day of March, 1994

Attest:

BRUCE LEHMAN

Attesting Officer

Commissioner of Patents and Trademarks